United States Patent Office 3,505,935
Patented Apr. 14, 1970

3,505,935
EXPOSURE CONTROL SYSTEM FOR A PHOTOGRAPHIC CAMERA
Edwin H. Land, Cambridge, Mass., assignor to Polaroid Corporation, Cambridge, Mass., a corporation of Delaware
Filed Apr. 6, 1967, Ser. No. 628,941
Int. Cl. G03b 7/08
U.S. Cl. 95—10                               14 Claims

ABSTRACT OF THE DISCLOSURE

This disclosure depicts an exposure control system for a photographic camera, and more particularly an exposure control system comprising a photometer, adjustable exposure means for controlling two parameters of exposure, and coupling means coupling the photometer to the exposure means, the system being such that appropriate exposure values may be selected for exposing photosensitive materials over a wide range of scene brightness levels.

SUMMARY OF THE INVENTION

Briefly, one aspect of the invention comprises an exposure control system for a photographic camera having adjustable exposure means providing a range of exposure values at which associated photo-sensitive materials may be exposed. The system includes a photometer capable of determining photometric values corresponding to a broad range of scene brightness levels. Variable coupling means couples the photometer to the adjustable exposure means such that for a first range of scene brightness levels adjustment of the coupling means to select an appropriate exposure value, as determined by the photometer, acts upon the adjustable exposure means to effect a variation of one parameter of exposure, and for a second range of scene brightness levels, which may be partially coextensive with said first range of scene brightness levels, adjustment of the coupling means to select an appropriate exposure value acts upon the adjustable exposure means to effect a variation of another exposure parameter.

Another aspect of the invention concerns an extended range comparison photometer suited especially for employment in the above-described system.

It is an object of this invention to provide a photographic exposure control system for a relatively inexpensive hand-held camera capable of determining appropriate exposure values for exposing photosensitive materials over a very wide range of scene brightness levels.

It is another object of this invention to provide an exposure control system including a photometer, adjustable exposure means capable of effecting exposure of associated photosensitive material over a wide range of exposure values and coupling means coupling the photometer to the exposure means, the coupling means being constructed such that for a first range of scene brightness levels, adjustment of the coupling means to select an appropriate exposure value, as determined by the photometer, effects an adjustment of one parameter of exposure in the exposure means, and for a second range of scene brightness levels, adjustment of the coupling means to select an appropriate exposure value effects an adjustment of the other of the exposure parameters.

It is a further object that such a photometer may take the form of a comparison photometer having extended range capability by virtue of an adjustability not only of the light source associated with the scene brightness, but also of the source of luminous energy with which the scene brightness may be compared.

It is a further object of this invention to provide an exposure control system for a photographic camera which is highly accurate and inexpensive to produce, and which offers speed and ease of operation.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which is indicated in the claims.

BRIEF DESCRIPTION OF THE DRAWINGS

For an understanding of the nature and objects of the invention, reference should be had to the following detailed description taken in connection with the accompanying drawings wherein.

DESCRIPTION OF THE PREFERRED EMBODIMENTS

Figure 1:
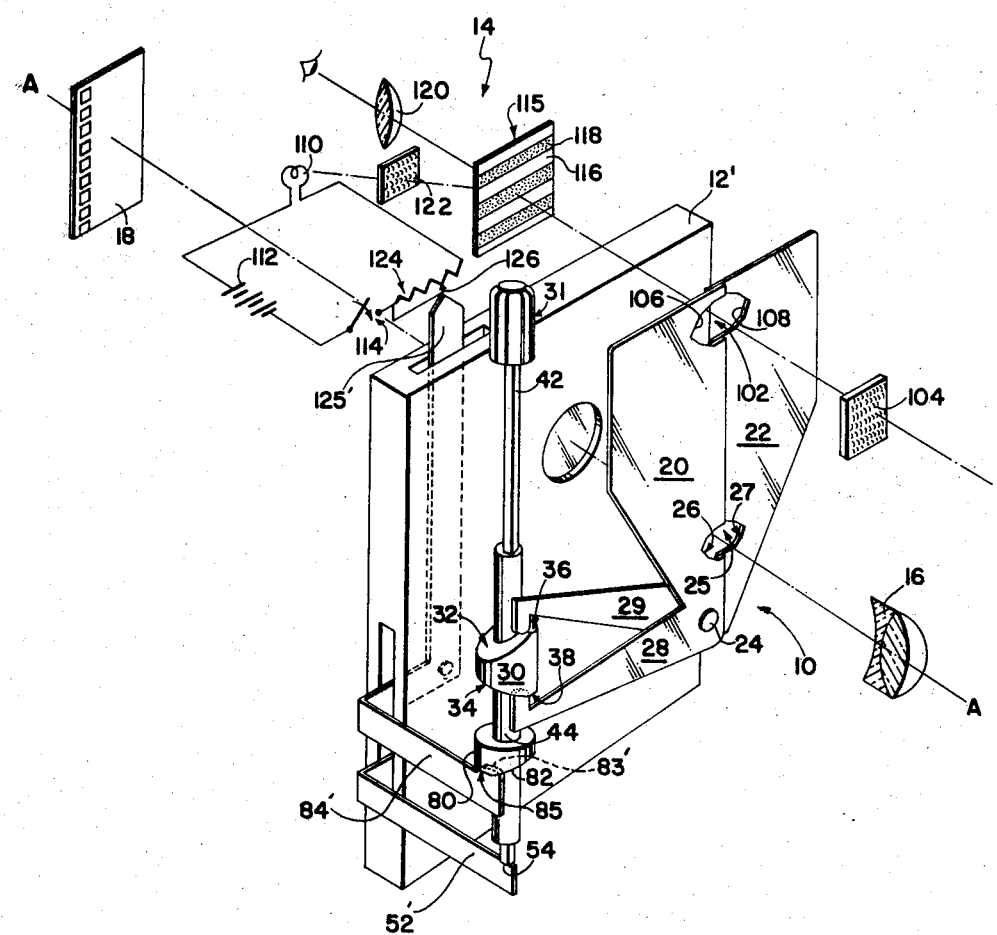
FIGURE 1 illustrates schematically a photographic exposure control system representing one structure by which the invention may be implemented.

FIGURE 1 of the drawings schematically illustrates a dual range exposure control system for a photographic camera comprising in accordance with the invention a variable diaphragm 10, a variable speed shutter 12', and a photometer 14 coupled to the shutter and a diaphragm such that, in response to photometric indications provided by the photometer, for a first range of scene brightness levels the effective exposure aperture is opened to select an appropriate exposure value and for a second range of brightness levels, the shutter speed is appropriately reduced. The illustrated exposure control system is shown as controlling two parameters of exposure, namely, the effective aperture and the exposure interval.

In more detail, the illustrated exposure control system may be incorporated in a photographic camera including optical image forming means, such as a simple achromatic doublet lens 16, on an optical axis A—A, variable diaphragm means 10 for providing a range of effective aperture values through which a photosensitive material 18 may be exposed to scene light, and a variable speed shutter 12 for providing a range of exposure intervals during which the photosensitive material 18 may be exposed.

The variable diaphragm means 10 may comprise a pair of diaphragm blades 20, 22 pivoted about a common pivot axis, shown as being provided by a pin 24, and containing cooperating recessed portions 26, 27, respectively, which together define the effective exposure aperture 25 through which the photosensitive material 18 is exposed.

The diaphragm blades 20, 22 include obliquely extending arms 28, 29, respectively, which engage a cam 30 mounted upon an actuator 31 comprising part of the coupling means, as described below. The cam 30 has oppositely acting axial camming surfaces 32, 34. The camming surfaces 32, 34, include zero-displacement areas 36, 38 upon which the arms 29, 28, respectively, may dwell at certain predetermined angular positions of the cam 30. Rotation of the cam 30 may be effected by rotation of the actuator 31 which includes a shaft 42 upon which a sleeve 44 carrying cam 30 is slidably mounted.

Figure 2:
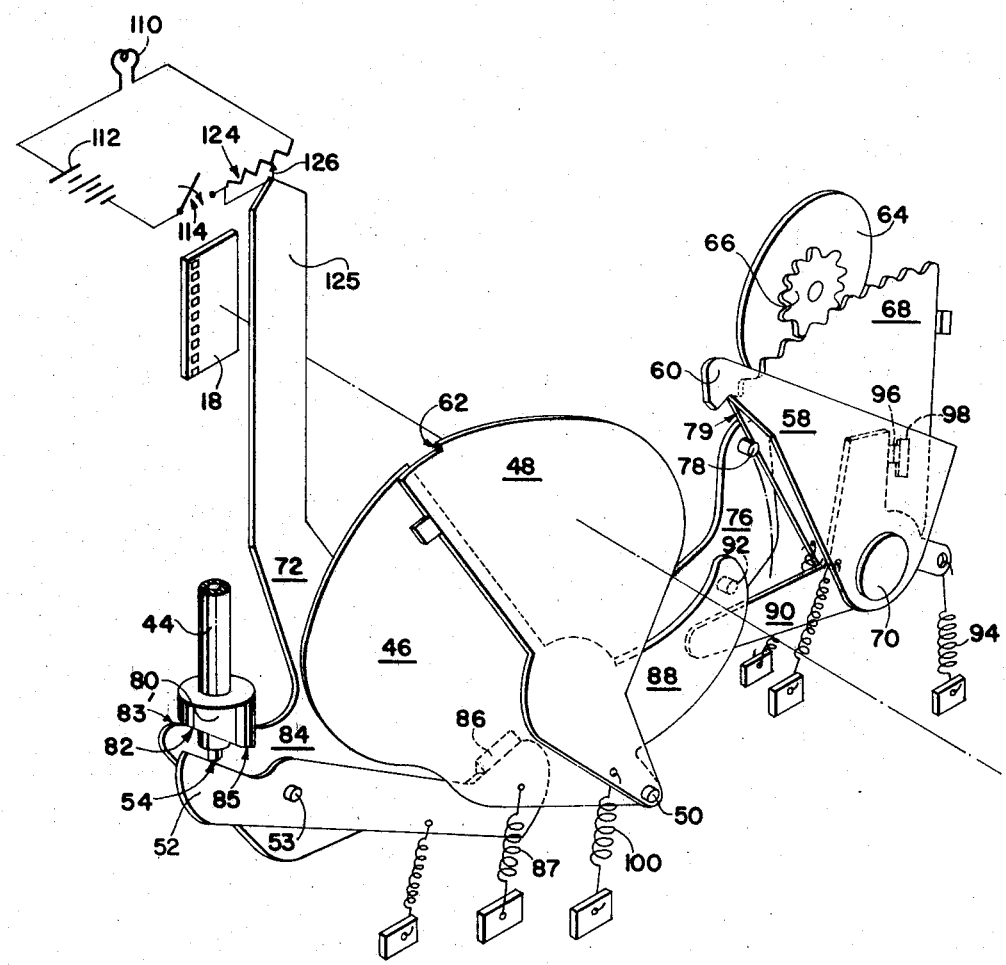
FIGURE 2 shows a portion of the exposure control system of FIGURE 1, a variable speed shutter mechanism shown schematically in FIGURE 1 being represented in structural form.

The variable speed shutter 12 is shown in detail in FIG. 2 and represents one shutter which may be employed in the exposure control system of this invention. The shutter 12 is shown as comprising an opening blade 46 and a closing 48, both of which blades are mounted for rotation about a pin 50 providing common pivot axis. The shutter 12 includes a cocking lever 52 mounted for rotation about a pin 53. In FIGURE 1 the member corresponding schematically to cocking lever 52 is designated 52'. The cocking lever has a sloping edge 54 abuttingly engaging the end surface 54 of actuator shaft 42 during actuation of the shutter 12.

The closing blade 48 is latched in its light unblocking position by means of a latch 58 having a pawl 60 which engages an edge 62 extending generally radially outward from the closing blade 48. As explained in detail below, latch 58 is disengaged from the edge 62 at a time after the release of the opening blade 46 which is dependent upon a time delay introduced by delay means comprising part of the shutter 12.

The aforementioned delay means may comprise, as illustrated, an inertia member, such as a rotatable flywheel 64, to which a spur gear 66 is coaxially connected for transmitting rotation thereto. A gear sector member 68 rotatably mounted about a pin 70, upon which latch 58 may also be mounted, has gear teeth 71 mating with the spur gear 66. As explained below, the extent of the delay which is introduced between the release of the opening blade 46 to initiate exposure and the release of the closing blade 48 to terminate exposure is determined by the angular extent to which the gear sector member 68 must be displaced during exposure against the retarding influence of the flywheel 64.

A delay set lever 72 determines the initial angular attitude of the gear sector member 68 and thus controls the length of the exposure interval effected by shutter 12. The delay set lever 72 may be pivotally mounted upon pin 51. The lever 72 has an extension 76 having a transverse projection 78 thereon abuttingly engaging an edge 79 of the gear sector member to control the initial position thereof.

The angular attitude of the delay set lever 72 itself is determined by the angular setting of actuator 31 which is coupled to the delay set lever 72 by means of an axial cam 80 mounted on the sleeve 44. Cam 80 has a camming surface 82 engaging a cam following surface 83 on a portion 84 of delay set lever 72.

In FIGURE 1 the schematic representation of portion 84 and cam following surface 83 thereon are designated 84' and 83', respectively. For reasons which will become more evident below, the camming surface 82 on cam 80 has an area 85 of zero displacement upon which the cam following surface 83 dwells for a certain range of angular settings of the actuator 31.

The operation of the illustrated shutter 12 is as follows. Depression of the actuator 31 to actuate the shutter 12 causes the cocking lever 52 to be rotated in a counterclockwise direction (in FIG. 2). The cocking lever 52, acting upon a ramp-like projection 86 on opening blade 46, drives the opening blade 46 (and the closing blade 48) clockwise until the closing blade 48 is engaged by latch 58. The ramp-like projection 86 on the opening blade 46 then escapes from the working end of the cocking lever 52, allowing the opening blade 46, under the influence of a suitable spring 87, to snap back to its initial light unblocking position.

During the cocking operation as cocking lever 52 is being rotated an arm 88 affixed to the opening blade 46 drives an intermediate member 90, by means of a pin 92 on the arm 88, in the counterclockwise direction. Release of the opening blade 46 frees the intermediate member 90 for clockwise rotational movement under the influence of a relatively stiff spring 94 into engagement with a lug 96 on the gear sector member 68. The angular position of the gear sector member 68 previous to engagement of the intermediate member 90 is determined, as explained above, by the angular attitude of the delay set lever 72, which in turn depends upon the angular setting of actuator 31.

It is noted that changes in the setting of delay set lever 72 in the clockwise direction alters the angular attitude of gear sector member 68 in the counterclockwise direction, thus increasing the exposure interval of the shutter 12. The spring 94 is sufficiently strong to rotate the gear sector member 68 against the inertial retarding effect of the flywheel 64 to an extreme angular position wherein the lug 96 on the gear sector member 68 engages a lug 98 on the latch 58, causing the latch 58 to be impelled in the clockwise direction to disengage the closing blade 48. The closing blade 48 is then free to return to its initial light blocking position, under the influence of a spring 100, on the optical axis A—A to terminate the exposure interval.

From the above description, it should become evident that the total exposure interval, commencing immediately after the release of the opening blade 46 from cocking lever 52, is determined by the initial angular attitude of the gear sector member 68, which in turn is controlled by the setting of the delay set lever 72.

Photometric means for assisting in the determination of the relative brightness level of the scene to be photographed may take the form of a comparison photometer 14. FIGURE 1 schematically illustrates a comparison photometer including means for displaying an area of substantially uniform illumination the intensity of which is representative of the integrated scene brightness level. Such display means may comprise a variable area aperture 102 and an optical light diffusing element 104. The aperture 102 is preferably defined by cooperating recesses 106 and 108 formed in the diaphragm blades 20, 22, respectively.

An incandescent lamp 110 may be employed to serve as a light source of known luminous energy output, the level of which may be compared with the relative brightness level of the display means displaying the level of scene brightness. The lamp 110 may be connected in an electrical circuit including a power supply 112 and a suitable switch 114 caused to be closed at the initiation of a photometric operation.

In order that the relative brightness levels of the scene and the source lamp 110 may be visually compared, a target 115 may be provided with alternate light-transmissive and light-reflective areas 116, 118, respectively, thereon. An eyepiece 120 is provided in order that the user may be able to focus upon the target 115. A light diffusing element 112 is preferably provided for diffusing and distributing the light from the source lamp 110 to provide a substantially uniform illuminated area for more accurate comparison of the lamp brightness level with the relative scene brightness level.

Comparison photometers commonly provide a source of referent illumination, such as a lamp, having a fixed luminous energy output which may be compared with the relative brightness level of the scene to be photographed. The brightness of the source of radiation representing the scene brightness may be varied until a photometric balance as determined visually by the user by means of a target, is achieved.

However, a photometric balance on the target 115 can also be achieved if the brightness level of the display means associated with the level of scene brightness is maintained constant and the luminous energy output of the source of referent illumination is varied. To this end, the control circuit including lamp 110 may include a variable resistor 124 for adjusting the flow of current through the lamp 110, and thus the luminous energy output thereof. It has been found that for use with predetermined photosensitive materials, a system may be readily constructed in accordance with this invention which has the characteristic that for a given change in the scene brightness level a linear relationship exists between the incremental resistance change in variable resistor 124 necessary to maintain a photometric balance on target 115 and the incremental change in exposure value necessary to produce an equally satisfactory exposure at the new level of scene brightness. Thus, a conventional linear rheostat or linear potentiometer may be employed as variable resistor 124.

By the simple expedient of connecting an arm 125 (125' in FIGURE 1) on the delay set lever 72 to a wiper arm 126 on the variable resistor 124, the duration of the exposure interval effected by the shutter 12 can be directly related to the luminous energy output of the lamp 110. Further, by forming the variable aperture 102 as part of the diaphragm blades 20, 22, variations in the effective exposure aperture are directly related to changes in the brightness of the display means associated with the scene brightness level. It is seen then that by this invention extremely simple means are provided by which the two compared sources of luminous energy in a comparison photometer may be simply and directly coupled to exposure means in a photographic camera controlling two parameters of exposure.

Before explaining the operation of the subject exposure control system, it should be pointed out that in the illustrated embodiment, the cams 30 and 80 are designed and arranged in such a relationship that when camming surfaces 32 and 34 on cam 30 are operative, cam following surface 84 in delay set lever 72 dwells on the area 85 of zero displacement on cam 80. Thus, when the effective exposure aperture 75 is being varied by rotation of actuator 31, the exposure interval is maintained substantially constant. Conversely, when camming surface 82 on cam 80 is driving cam following surface 84 on delay set lever 72, the arms 28, 29 on diaphragm blades 20, 22 dwell upon the areas 38, 36 of zero displacement on camming surfaces 34, 32 of cam 30. The effective exposure aperture 25 is thus held constant during variations of the exposure interval. It should be understood, however, that this invention contemplates other interrelationships of exposure interval and effective aperture. For example, the effective aperture and exposure interval might be varied simultaneously, at least over a range of scene brightness levels representing a transition between the range in which the exposure interval is varied to establish an appropriate exposure value and another range in which the exposure interval is varied to establish an appropriate exposure value. Stated in another way, the respective ranges of scene brightness over which the exposure interval and effective aperture are varied to establish an appropriate exposure value need not be mutually exclusive, as they are in the illustrated embodiment, but instead may be overlapping to any desired degree.

The operation of the illustrated system is as follows. Assuming proper tolerances and calibration of all the relevant system factors and components, the user need only rotate the actuator 31 while viewing the target 115. For a first range of scene brightness values, rotation of the actuator 31, by the action of cam 30 on arms 28, 29, simultaneously effects a variation in the effective exposure aperture 25 and a related change in the area of the aperture 102. At an appropriate exposure value, taking into account the exposure interval to which the shutter is set and the instantaneous effective exposure aperture 25, a photometric balance between the brightness of the reference light source, comprising the lamp 110 and the diffuser 122, and the display means displaying the relative scene brightness level, is established.

For a second range of scene brightness levels, rotation of the actuator 31 causes the shutter speed to vary as the effective exposure aperture 25 is maintained at a maximum value by the dwell of the arms 28, 29 on the zero-displacement areas 38, 36 of the camming surfaces 34, 32 on cam 30. More specifically, in this range of scene brightness levels rotation of the actuator 31 causes camming surface 82 on cam 80 to drive the cam following surface 84 on delay set lever 72 and thus to alter the angular attitude of the delay set lever 72. Adjustment of the attitude of delay set lever 72 effects a simultaneous variation in the luminous energy output of lamp 110, by the interconnection of lever 72 to variable resistance 124, and adjustment of the effective exposure interval, as explained above. When the brightness of the lamp 110 is brought into photometric correspondence with the brightness of the display means, as visually detected by means of the target 115, an exposure value is established which is appropriate for the scene brightness level. Thus, for this extended range of scene brightness levels, the operator need only continue to rotate the actuator 31 until a photometric balance on the target 115 is established, the appropriate exposure value being achieved by retardation of the exposure interval while the exposure aperture is maintained at a maximum value.

Certain changes may be made in the above apparatus, other than those indicated above, without departing from the scope of the invention herein involved. For example, whereas a comparison-type photometer, as illustrated, is preferred, other photometric means may be employed to implement the principles of the subject exposure control system. Adjustable exposure means other than those specifically illustrated for providing ranges of values of parameters of exposure are also within the purview of this invention. It is also contemplated that persons with ordinary skill in the photographic and related arts may devise other structures for coupling such adjustable exposure means to appropriate photometric means in accordance with the concepts of this invention. It is therefore intended that all matter contained in the above description or shown in the accompanying drawings shall be interpreted as illustrative and not in a limiting sense.

What is claimed is:

1. An exposure control system for exposing photosensitive material on an optical axis in a photographic camera, comprising:
    variable aperture means on said axis for providing a range of effective exposure apertures;
    variable shutter means on said axis for providing a range of exposure intervals;
    photometric means comprising:
        display means adapted to be illuminated in accordance with scene brightness;
        light source means for providing controlled reference illumination; and
        means for comparing the relative brightness levels of the reference illumination provided by said light source means and the illumination of said display means for determining photometric values corresponding to particular levels of scene brightness; and
    means for coupling said aperture means and said shutter means to said photometric means to effect variations in said effective aperture in a first range of scene brightness levels to select an appropriate exposure value according with the photometric value determined by said photometric means as corresponding to the level of scene brightness, and to effect variations in said exposure interval in a second range of scene brightness levels to select an appropriate exposure value according with photometric values determined by said photometric means.

2. An exposure control system for exposing photosensitive material on an optical axis in a photographic camera, comprising:
    first adjustable means for providing a range of values of a first exposure parameter;
    second adjustable means for providing a range of values of a second exposure parameter;
    photometric means responsive to scene light for determining photometric values corresponding to particular levels in a broad range of scene brightness levels, comprising:
        display means displaying an area of illumination the intensity of which is representative of the level of scene brightness, display control means between said display means and the scene for varying the level of illumination of said display means, a light source having a known luminous energy output, source control means acting upon said source for varying the luminous energy output of said source, and means for comparing the relative brightness levels of said source and said display means; and coupling means for coupling said display control means and said source control means to said first and second adjustable means to cause an approximate photometric balance in the relative brightness levels of said source and of said display means when an appropriate exposure value is selected, said coupling means being constructed to effect in a first range of scene brightness levels, adjustments of said display control to achieve said photometric balance and to operate upon said first adjustable means to vary said first exposure parameter to establish said appropriate exposure value, said coupling means being constructed to effect, in a second range of scene brightness levels, adjustments of said source control means to achieve said photometric balance and to operate upon said second adjustable means to vary said second exposure parameter to establish said appropriate exposure value.

3. The apparatus defined by claim 2 wherein said coupling means operates upon said first adjustable means to the exclusion of said second adjustable means to effect a variation of said first exposure parameter values over said first range of scene brightness values, and wherein said coupling means operates upon said second adjustable means to the exclusion of said first adjustable means to effect a variation of said second exposure parameter values over said second range of scene brightness values, whereby during adjustments of said coupling means in scene brightness levels in said first range said second exposure parameter is maintained substantially constant, and during adjustments of said coupling means in said second range of scene brightness levels said first exposure parameter is maintained substantially constant.

4. The apparatus defined by claim 3 wherein said first and second ranges of scene brightness values are mutually exclusive.

5. The apparatus defined by claim 4 wherein said light source comprises lamp means connectable in a power supply circuit and wherein said source control means includes variable resistance means connected in said circuit for controlling the supply of power through said lamp means and thus the luminous energy output thereof.

6. The apparatus defined by claim 5 wherein said coupling means includes cam means for effecting adjustments of one of said first and second adjustable means during adjustment of said coupling means, said coupling means simultaneously operating upon said variable resistance means to effect predetermined variations in the output of said source.

7. An exposure control system for exposing photosensitive material on an optical axis in a photographic camera, comprising:

variable diaphragm means on said optical axis for defining a range of effective aperture values through which the photosensitive material may be exposed to scene light;

variable speed shutter means on said axis for providing a range of exposure intervals during which the photosensitive material may be exposed to scene light;

a comparison photometer for determining photometric values for a broad range of scene brightness levels, comprising:

display means displaying an area of substantially uniform illumination the intensity of which is representative of the scene brightness level, display control means between said display means and the scene for varying the level of illumination of said display means, a light source having a known luminous energy output, source control means acting upon said source for varying the luminous energy output of said source, and means for comparing the relative brightness levels of said source and said display means; and adjustable coupling means coupling said display control means and said source control means to said diaphragm means and to said shutter means such that an approximate photometric balance in the relative brightness levels of said source means and of said display means in said photometer corresponds to the selection of appropriate exposure values, said coupling means being constructed such that for a first range of scene brightness levels adjustment of said coupling means simultaneously effects adjustment of said display control means to achieve said photometric balance and operates upon said variable diaphragm means to vary the effective aperture value to establish said appropriate exposure value while maintaining said exposure interval substantially constant, and for a second range of scene brightness levels non-coextensive with said first range adjustment of said coupling means simultaneously effects adjustment of said source control means to achieve said photometric balance and operates upon said shutter means to vary the exposure interval to establish said appropriate exposure value while maintaining said effective aperture value at a substantially constant maximum value.

8. The apparatus defined by claim 7 wherein said light source comprises lamp means connectable in a power supply circuit and wherein said source control means includes variable resistance means connected in said circuit for controlling the supply of power through said lamp means and thus the luminous energy output thereof.

9. The apparatus defined by claim 8 wherein said display control means comprises a variable aperture coupled to said diaphragm means so as to vary in correspondence therewith.

10. The apparatus defined by claim 9 wherein said coupling means includes cam means operating upon said diaphragm means to effect variations in the effective exposure aperture and upon said shutter means to vary the effective exposure interval, said cam means being effective when actuated to drive said diaphragm means and said shutter means independently and successively.

11. The apparatus defined by claim 10 wherein said cam means operating upon said shutter means operates also upon said source control means such that variations in the ouput of said source are coordinated with adjustments in the exposure intervals effected by said shutter means.

12. An exposure control system for exposing photosensitive material on an optical axis in a photographic camera, comprising:

adjustable exposure means capable of admitting light to said photosensitive material in predetermined quantities over a broad range of exposure values;

a comparison photometer for comparing the level of scene brightness with a light source having a known luminous energy output, said photometer including variable light attenuating means for attenuating the scene light admitted to said photometer for comparison with said source and source control means for varying the luminous energy output of said source;

adjustable coupling means coupling said adjustable exposure means to said photometer such that an approximate photometric balance in the relative intensity levels of said source and said scene light admitted into said photometer through said attenuating means corresponds to a selection of an appropriate exposure value, said coupling mean being constructed such that for a first range of scene brightness levels adjustment of said coupling means effects an actuation of said light attenuating means and a corresponding variation in the amount of scene light admitted by said attenuating means to achieve said photometric balance, and for a second range of scene brightness levels adjustment of said coupling means effects a variation in the luminous energy output of said source to achieve said photometric balance.

13. The apparatus defined by claim 12 wherein said first and second ranges are mutually exclusive.

14. The appartus defined by claim 13 wherein said light source comprises lamp means connectable in a power supply circuit and wherein said source control means includes variable resistance means connected in said circuit for controlling the supply of power through said lamp means and thus the luminous energy output thereof.

References Cited

UNITED STATES PATENTS

| | | |
|---|---|---|
| 2,112,701 | 3/1938 | Leitz. |
| 3,086,435 | 4/1963 | Hennig. |

FOREIGN PATENTS

| | | |
|---|---|---|
| 677,861 | 1/1964 | Canada. |

JOHN M. HORAN, Primary Examiner.